(12) United States Patent
Inoue

(10) Patent No.: US 7,515,034 B2
(45) Date of Patent: Apr. 7, 2009

(54) VEHICLE REMOTE-OPERATION APPARATUS

(75) Inventor: Makoto Inoue, Hirakata (JP)

(73) Assignee: Panasonic Corporation, Osaka (JP)

( * ) Notice: Subject to any disclaimer, the term of this patent is extended or adjusted under 35 U.S.C. 154(b) by 600 days.

(21) Appl. No.: 11/357,212

(22) Filed: Feb. 21, 2006

(65) Prior Publication Data

US 2006/0186993 A1 Aug. 24, 2006

(30) Foreign Application Priority Data

Feb. 24, 2005 (JP) ............................. 2005-048356

(51) Int. Cl.
  *G05B 19/00* (2006.01)
(52) U.S. Cl. ............... 340/5.61; 340/5.72; 340/10.2; 307/10.1; 307/10.2
(58) Field of Classification Search ................ 340/5.62
  See application file for complete search history.

(56) References Cited

U.S. PATENT DOCUMENTS

| | | | |
|---|---|---|---|
| 6,429,768 B1 * | 8/2002 | Flick | 340/5.2 |
| 6,765,471 B1 * | 7/2004 | Baudard et al. | 340/5.61 |
| 6,980,082 B2 * | 12/2005 | Ueda et al. | 340/5.72 |
| 7,365,633 B2 * | 4/2008 | Inoue et al. | 340/5.61 |
| 2001/0028296 A1 * | 10/2001 | Masudaya | 340/5.61 |
| 2003/0038732 A1 * | 2/2003 | Watarai et al. | 340/825.72 |

FOREIGN PATENT DOCUMENTS

| | | |
|---|---|---|
| EP | 1 041 226 A1 | 10/2000 |
| EP | 1 388 469 A1 | 2/2004 |
| FR | 2 814 188 | 3/2002 |
| JP | 2003-106019 | 4/2003 |

\* cited by examiner

*Primary Examiner*—Jeffery Hofsass
*Assistant Examiner*—Brian Wilson
(74) *Attorney, Agent, or Firm*—Wenderoth, Lind & Ponack, L.L.P.

(57) ABSTRACT

A vehicle remote-operation apparatus is provided which transmits a regular authentication request signal from a vehicle-outside antenna and simultaneously transmits an interference wave for negating this authentication request signal from a vehicle-inside antenna, so that the communicable range can be limited between a radio portable unit allocated an identification code unique to a vehicle and the vehicle-outside antenna. Thereby, authentication communication is established only for a regular communication request.

13 Claims, 9 Drawing Sheets

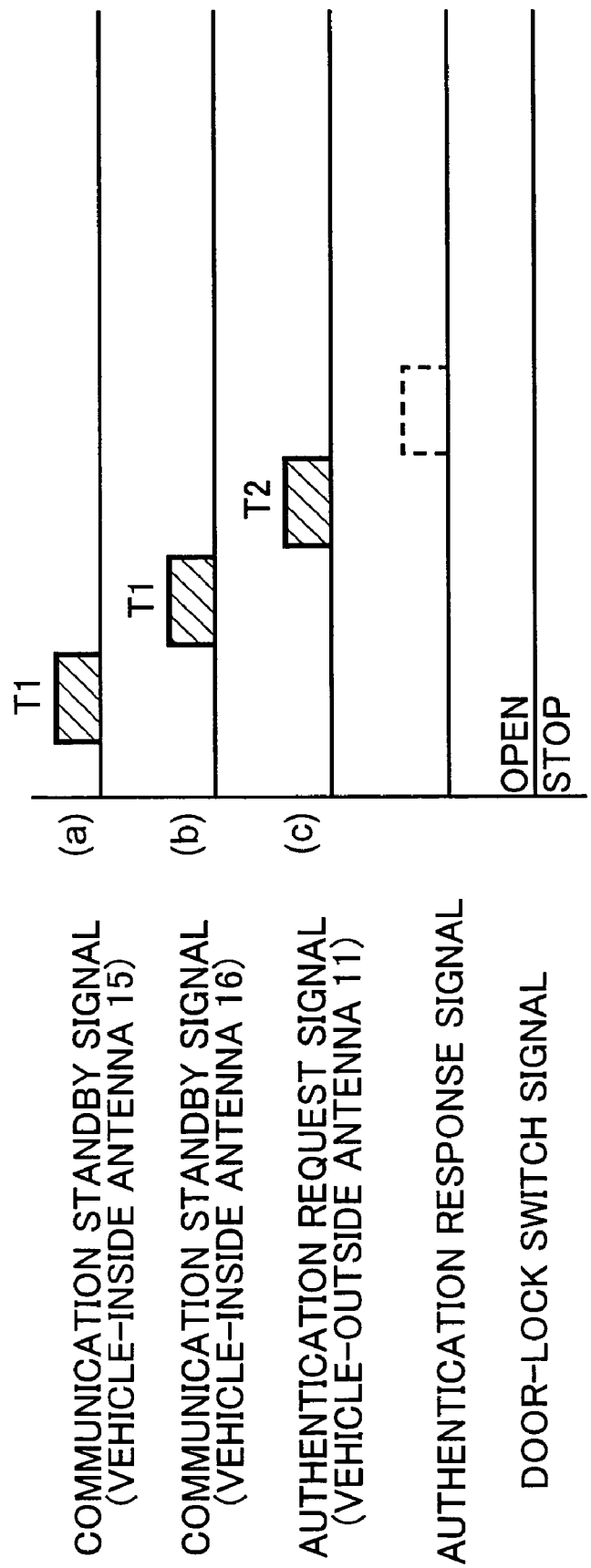

VEHICLE REMOTE-OPERATION APPARATUS

BACKGROUND OF THE INVENTION

1. Field of the Invention

The present invention relates to a vehicle remote-operation apparatus which includes a radio portable unit allocated an identification code unique to a vehicle.

2. Description of the Background Art

In recent years, a remote-operation apparatus for a vehicle has been rapidly developed which is capable of opening and closing a door lock of the vehicle without inserting a key in a door of the vehicle.

FIG. 4, FIG. 6 and FIG. 8 are top views of a conventional vehicle remote-operation apparatus installed in a vehicle, showing its configurations. FIG. 5, FIG. 7 and FIG. 9 are diagrams, showing operational sequences of the conventional vehicle remote-operation apparatus.

In FIG. 4, in a vehicle, vehicle-outside antennas 11, 12, 13, 14 are provided near the door on the driver's seat side, near the door on the passenger-seat side, inside of or near a rear bumper on the driver's seat side and inside of or near the rear bumper on the passenger-seat side, respectively. Inside of the vehicle, vehicle-inside antennas 15, 16 are provided.

Herein, a conventional operation method will be described. First, a vehicle owner 5, holding a radio portable unit 4 allocated an identification code unique to a vehicle, comes close to the driver's seat and touches the door on the driver's seat side. Thereby, a door outside switch 2 on the driver's seat side is turned on, and this on-signal is transmitted to a control unit 1. Then, the control unit 1 transmits an authentication request signal, using the vehicle-outside antenna 11 (see FIG. 5(a)). At this time, if the portable unit 4 is located within a range 11A where the authentication request signal from the vehicle-outside antenna 11 can be communicated, the portable unit 4 transmits an authentication response signal (see FIG. 5(b)). Then, an authentication-signal receiver 8 receives this authentication response signal. If this is a code on record, a door-lock switch signal is transmitted to the control unit 1 (see FIG. 5(c)). Thereby, the door lock is opened.

As shown in FIG. 6, when the portable unit 4 is located in the rear of the vehicle, the control unit 1 transmits the authentication request signal using the vehicle-outside antenna 11 (see FIG. 7(a)). At this time, the portable unit 4 is out of the communicable range 11A of the authentication request signal from the vehicle-outside antenna 11. This disables the portable unit 4 from transmitting the authentication response signal. After a predetermined time has elapsed, the control unit 1 transmits the authentication request signal using the vehicle-outside antenna 13 (see FIG. 7(b)). Then, the portable unit 4 located within a range 13A where this authentication request signal can be communicated transmits the authentication response signal (see FIG. 7(c)). Sequentially, the authentication-signal receiver 8 receives this authentication response signal. This result is checked, the door-lock switch signal is transmitted to the control unit 1, and the door lock is opened (see FIG. 7(d)).

Furthermore, in the same way, if the vehicle owner 5 who is holding the portable unit 4 comes close to the passenger seat, a door outside switch 3 on the passenger-seat side is turned on, as well. Then, this on-signal is transmitted to the control unit 1. Sequentially, the control unit 1 transmits the authentication request signal, using the vehicle-outside antenna 12. At this time, if the portable unit 4 is located within the range where the authentication request signal from the antenna 12 can be communicated, the portable unit 4 transmits the authentication response signal. Then, the authentication-signal receiver 8 receives this authentication response signal. If this is a registered code, the door-lock switch signal is transmitted to the control unit 1, so that the door lock is opened.

Moreover, if the vehicle owner 5 holding the portable unit 4 approaches the vehicle from behind it, a door outside switch 7 on the vehicle-rear side is turned on. Then, this on-signal is transmitted to the control unit 1. Sequentially, the control unit 1 transmits the authentication request signal, using the vehicle-outside antenna 13 or 14. At this time, if the portable unit 4 is located within the range where the authentication request signal from the vehicle-outside antenna 13 or 14 can be communicated, the portable unit 4 transmits the authentication response signal. Then, the authentication-signal receiver 8 receives this, and if this is a registered code, the door-lock switch signal is transmitted to the control unit 1, so that the door lock is opened. Incidentally, for example, Japanese Patent Laid-Open No. 2003-106019 specification is known as a prior-art document related to the present invention.

However, in the above described conventional method, for example, when the vehicle owner 5 stays in the vehicle with holding the portable unit 4, if a third person touches the door outside switch 2 or the like as a switch for starting communication, communication may be executed to establish an authentication. This can fall into the opening of a door lock.

Therefore, as shown in FIG. 8, let's assume the vehicle owner 5 who is holding the portable unit 4 sits within a communicable range 15A of the vehicle-inside antenna 15, and that a third person 6 who does not have the portable unit 4 comes close to the vehicle and touches the door outside switch 2. At this time, using the vehicle-inside antennas 15, 16, the control unit 1 transmits a communication standby signal for not responding to the portable unit 4 to the communicable ranges 15A and 16A, respectively (see FIGS. 9(a) and 9(b)). Thereby, even if the door outside switch 2 is turned on, the door lock is not opened. Thereafter, in order to detect the portable unit 4 being located within the vehicle-outside communicable range, the vehicle-outside antenna 11 transmits the authentication request signal to the portable unit 4 (see FIG. 9(c)). At this time, the portable unit 4 is within the range of the vehicle-inside antenna 15, so that an authentication response is not made. This prevents the door lock from being opened, and thus, the third person 6 from opening the door.

However, even in this case, as shown in FIG. 9, the authentication time taken to communicate for the standby is equivalent to a time (T1×2+T2). Herein, T1 denotes the transmission time of the communication standby signal, and T2 designates the transmission time of the authentication request signal. As a result, even if the vehicle owner 5 who is holding the portable unit 4 touches the door outside switch 2, the total transmission time (T1×2) of the communication standby signal is added to the transmission time T2 of the authentication response signal. Hence, more time is taken, thus lengthening the processing time.

SUMMARY OF THE INVENTION

It is an object of the present invention to provide a vehicle remote-operation apparatus which is capable of preventing a third person who does not own a registered portable unit from opening a door lock or doing another such, and executing a processing at high speed, so that this apparatus can offer great security and has a great capability for the processing.

A vehicle remote-operation apparatus according to an aspect of the present invention, comprising: a radio portable unit which is allocated an identification code unique to a vehicle; a plurality of transmitters which output an authentication request signal to the portable unit; an authentication-signal receiver which receives an authentication response signal outputted from the portable unit in response to the authentication request signal; and a controller which controls a specific in-vehicle unit based on the authentication result of the authentication response signal, so that the in-vehicle unit is permitted to operate or prohibited from operating, wherein when the portable unit is inside of the vehicle, the controller controls the plurality of transmitters so that a transmitter outside of the vehicle among the plurality of transmitters transmits a regular authentication request signal and so that at least one or more transmitters inside of the vehicle transmit an interference wave for negating the authentication request signal, and limits the communicable range between the portable unit and the transmitters.

A vehicle remote-operation apparatus according to another aspect of the present invention, comprising: a vehicle-side communication unit which is provided in a vehicle; and a portable unit which is allocated an identification code unique to a vehicle and communicates by radio with the vehicle-side communication unit, wherein: the vehicle-side communication unit includes a vehicle-outside transmitter which transmits an authentication request signal for the portable unit to at least the outside of the vehicle, a vehicle-inside transmitter which transmits the authentication request signal to the inside of the vehicle, an authentication-signal receiver which receives an authentication response signal outputted from the portable unit in response to the authentication request signal, and a controller which controls a specific in-vehicle unit based on the authentication result of the authentication response signal, so that the in-vehicle unit is permitted to operate or prohibited from operating; and the controller transmits the authentication request signal using the vehicle-outside transmitter, and using the vehicle-inside transmitter, transmits, to the inside of the vehicle, an interference wave for disabling the inside of the vehicle from receiving the authentication request signal by the vehicle-outside transmitter.

In the above described vehicle remote-operation apparatus, a regular authentication request signal is transmitted from a transmitter outside of the vehicle. At the same time, an interference wave for negating the authentication request signal is transmitted from at least one or more separate transmitters inside of the vehicle. Thereby, the communicable range can be limited between the portable unit and the transmitters. This helps realize a vehicle remote-operation apparatus which gives great security and has a great processing capability.

These and other objects, features and advantages of the present invention will become more apparent upon reading of the following detailed description along with the accompanied drawings.

BRIEF DESCRIPTION OF THE DRAWINGS

FIG. 9 is a diagram, showing an operational sequence of the conventional vehicle remote-operation apparatus.

DESCRIPTION OF THE PREFERRED EMBODIMENT

Figure 1:
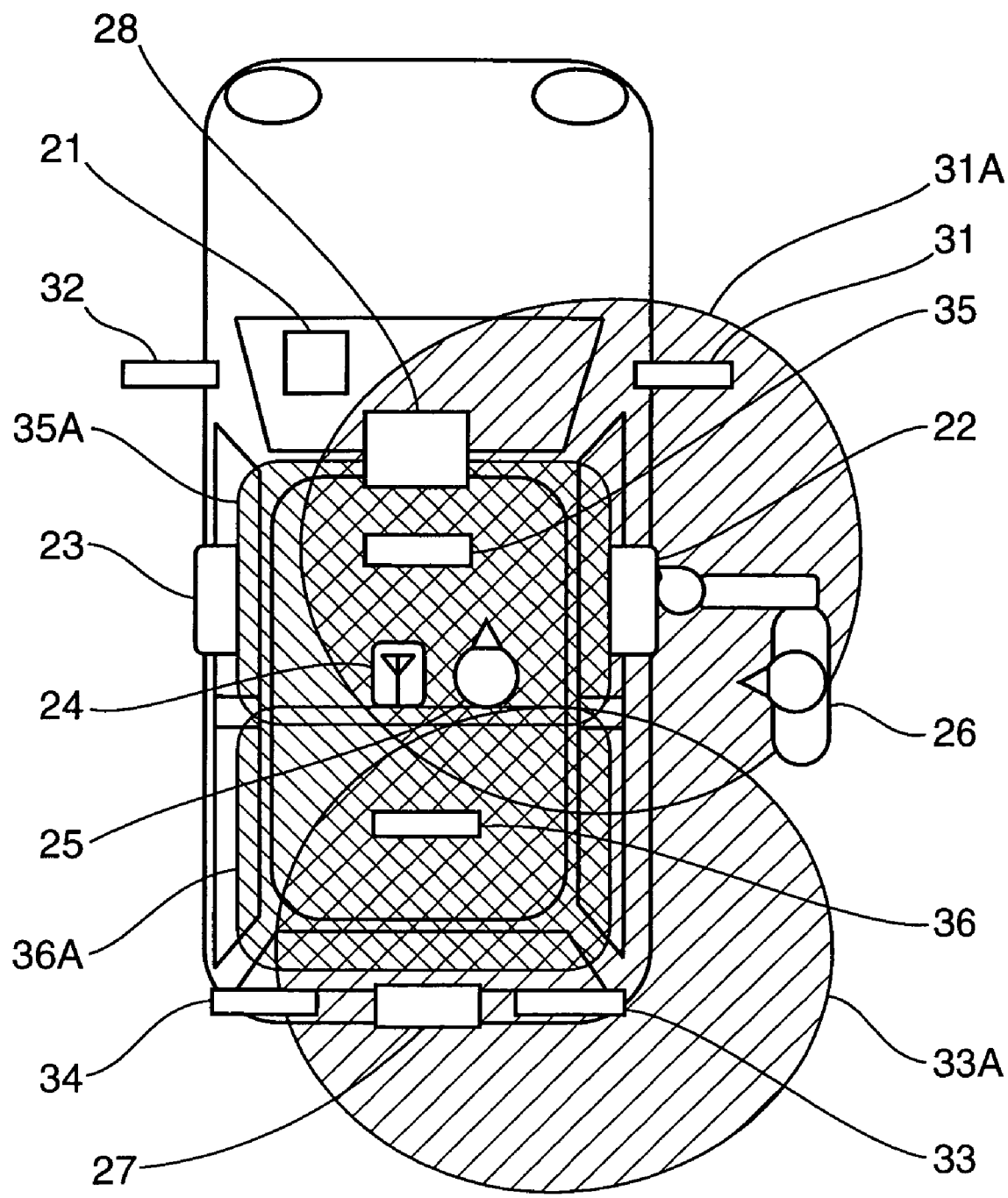
FIG. 1 is a top view of a vehicle remote-operation apparatus installed in a vehicle according to an embodiment of the present invention, showing its configuration.
Figure 2:
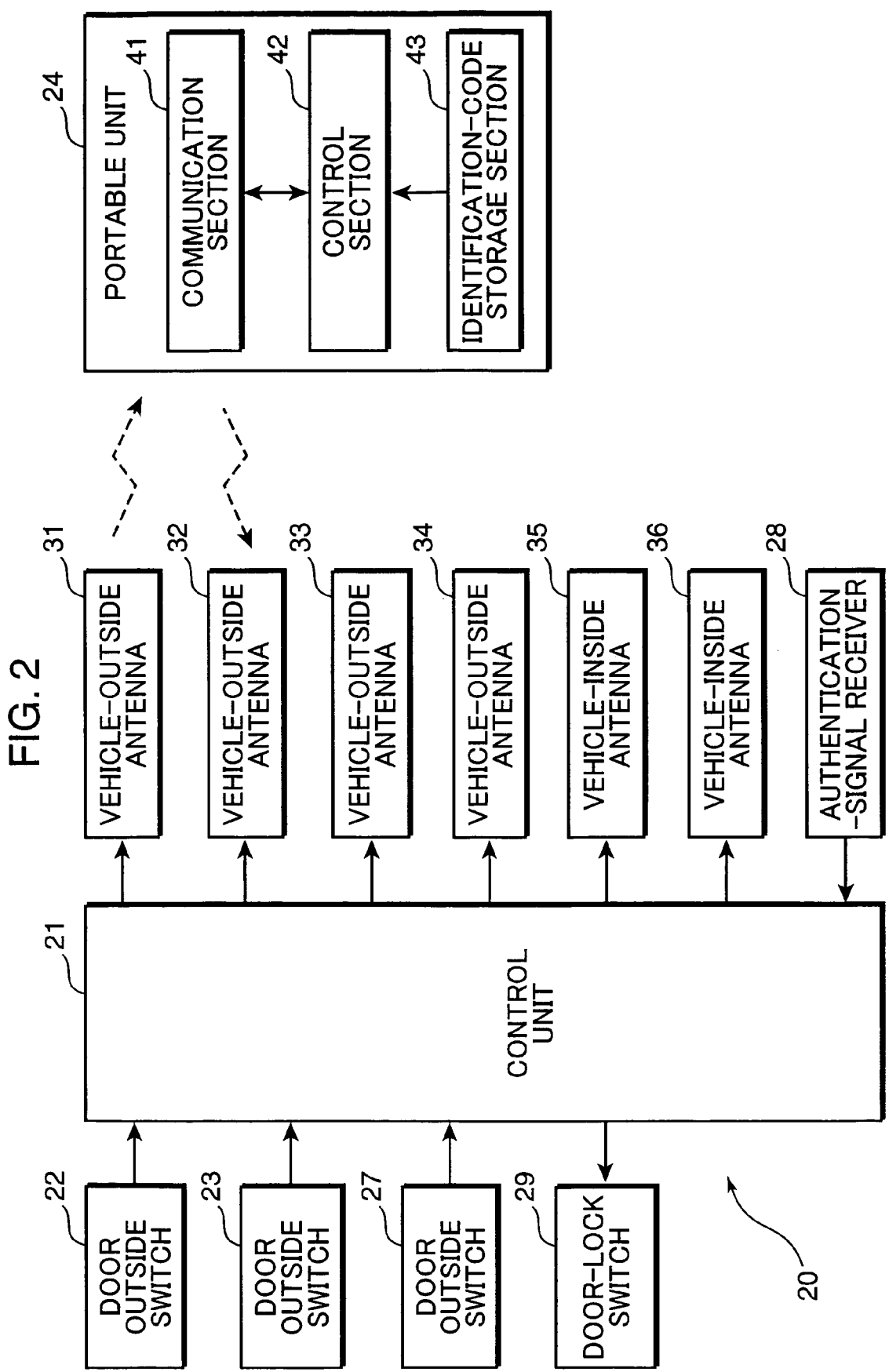
FIG. 2 is a block diagram, showing the configuration of the vehicle remote-operation apparatus shown in FIG. 1.
Figure 3:
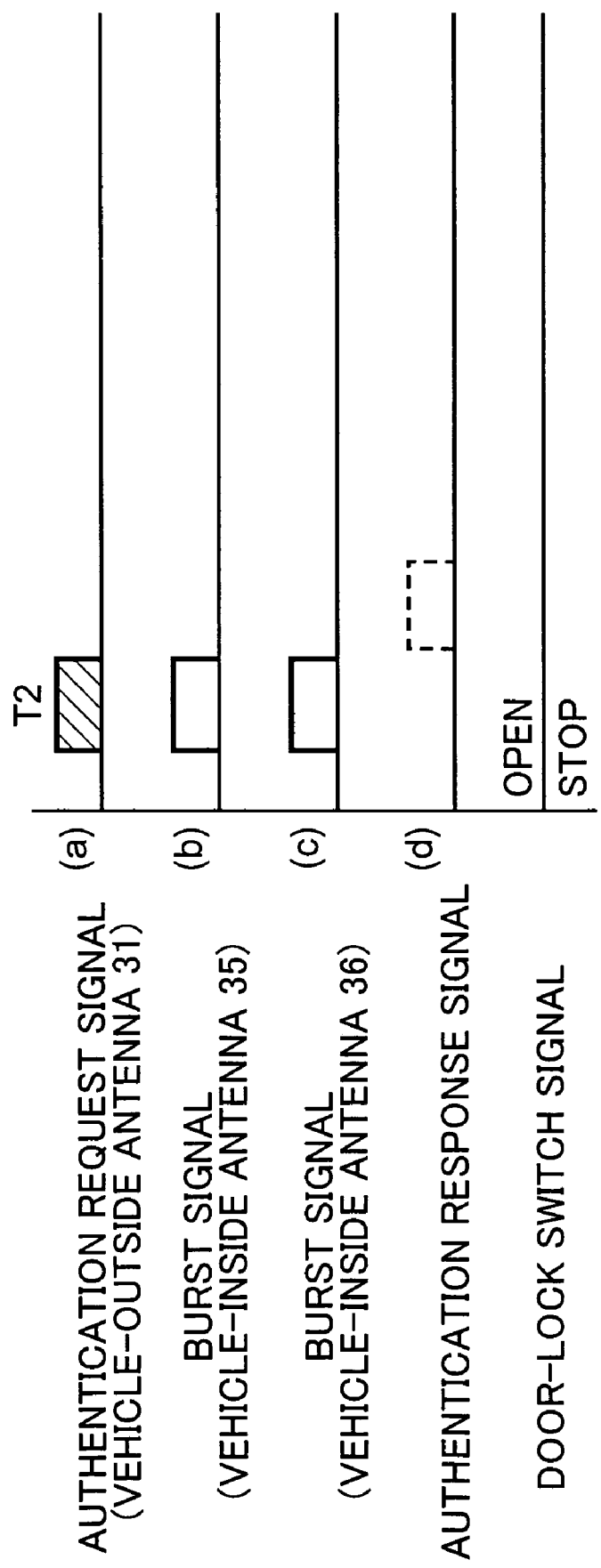
FIG. 3 is a diagram, showing an operational sequence of the vehicle remote-operation apparatus shown in FIG. 1.
Figure 4:
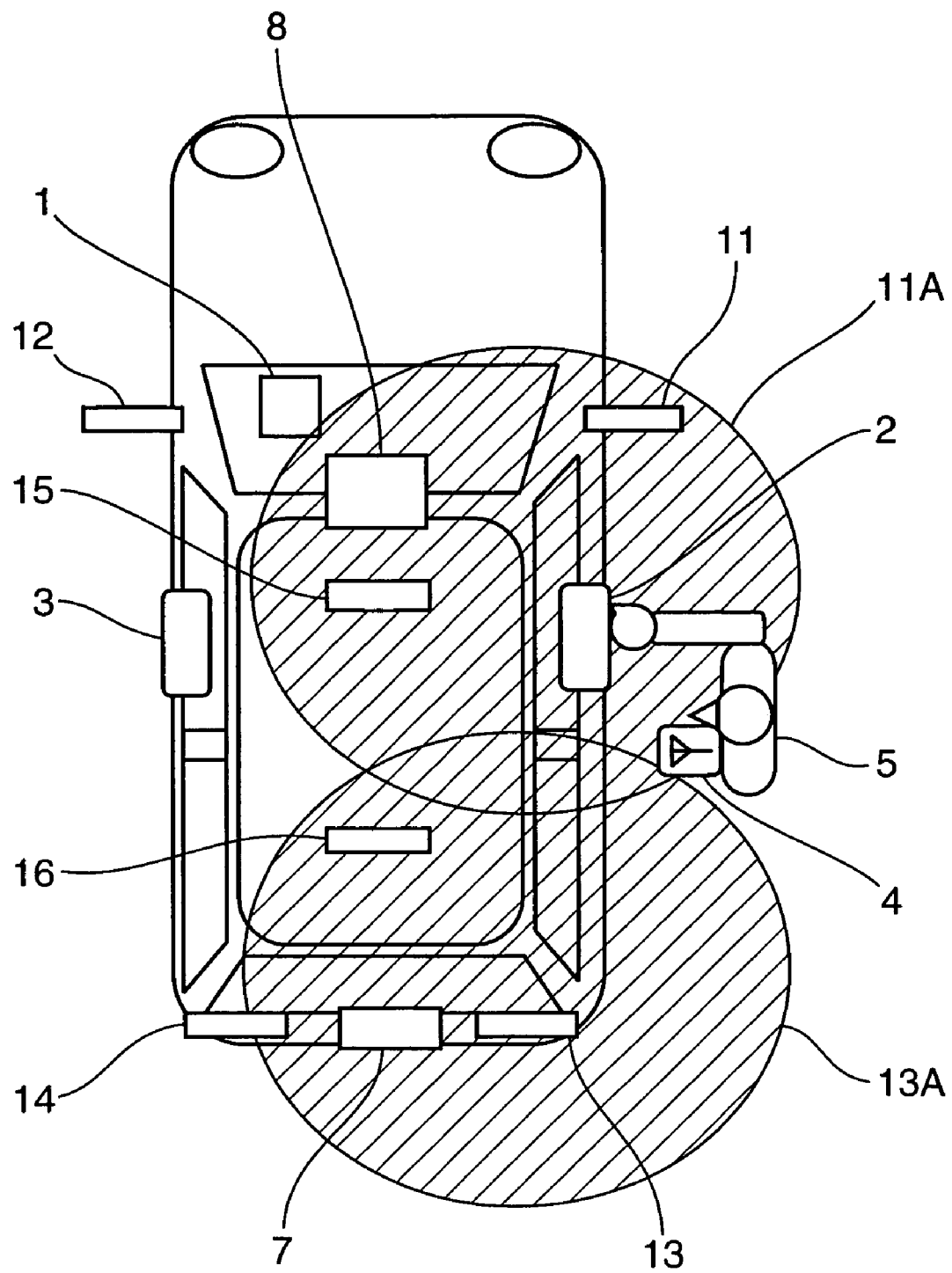
FIG. 4 is a top view of a conventional vehicle remote-operation apparatus installed in a vehicle, showing its configuration.
Figure 5:
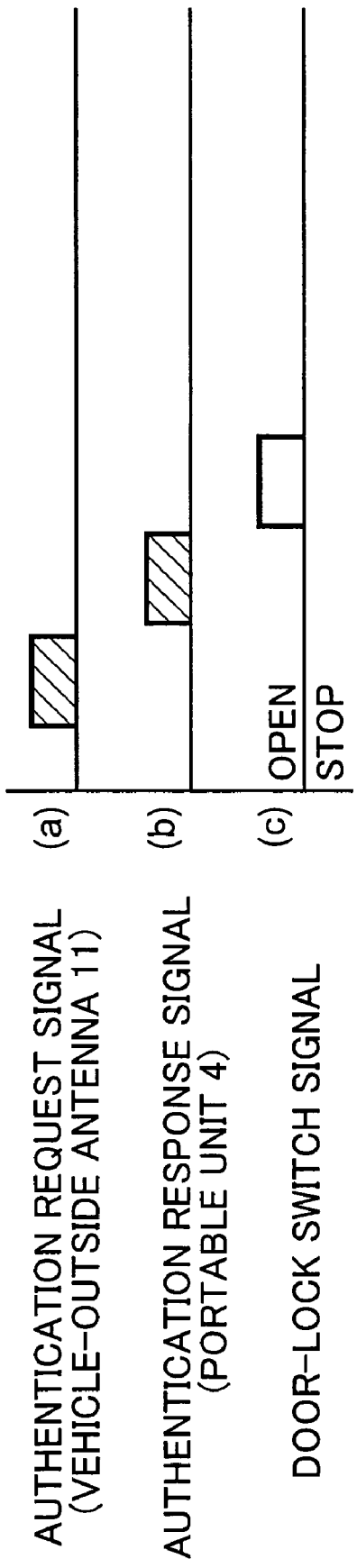
FIG. 5 is a diagram, showing an operational sequence of the conventional vehicle remote-operation apparatus.
Figure 6:
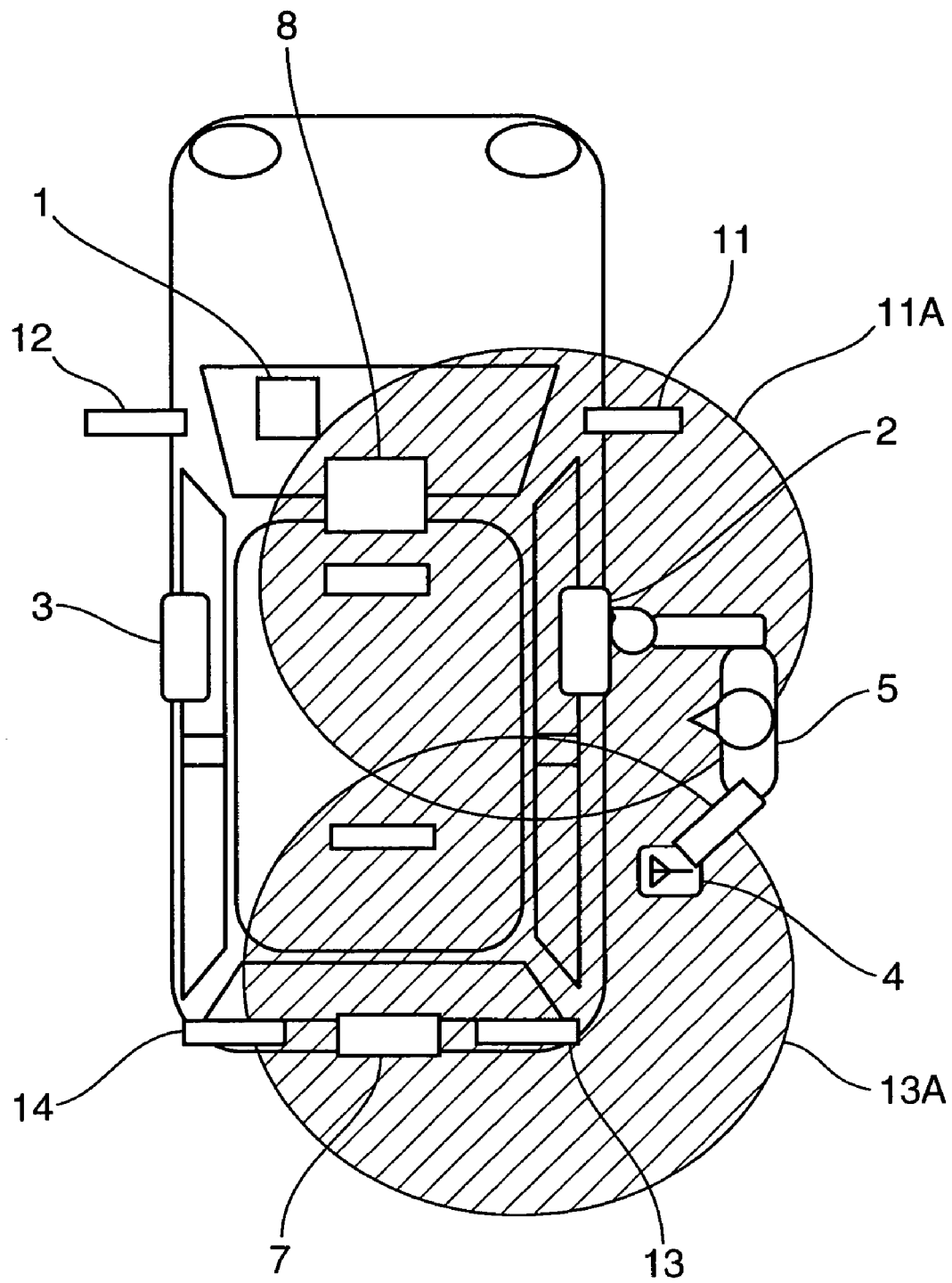
FIG. 6 is a top view of the conventional vehicle remote-operation apparatus installed in a vehicle, showing its configuration.
Figure 7:
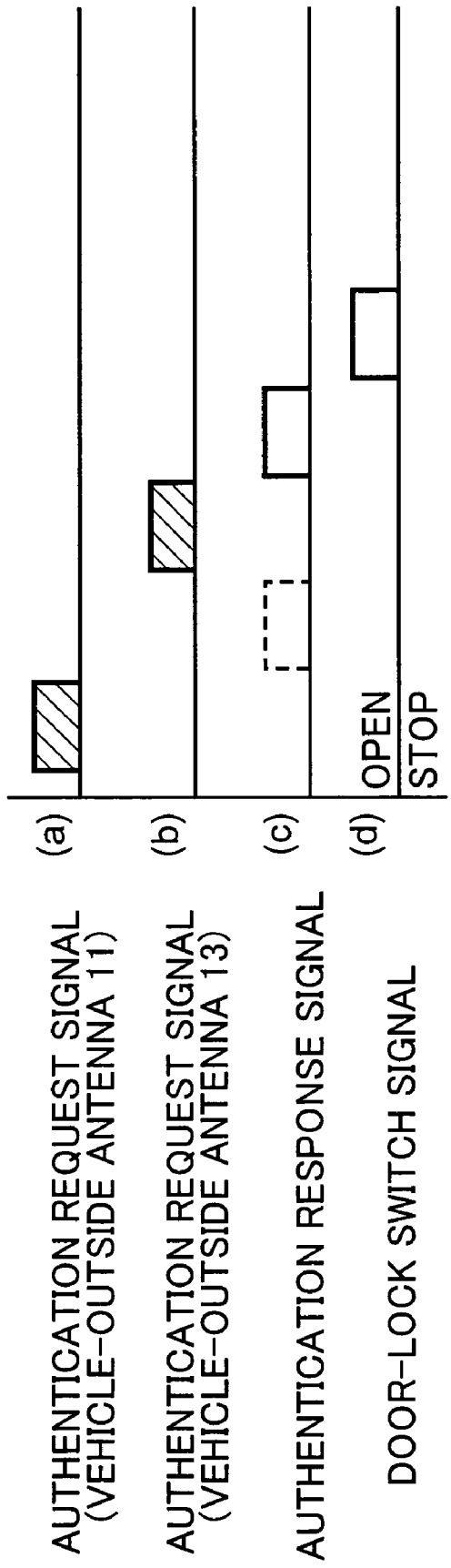
FIG. 7 is a diagram, showing an operational sequence of the conventional vehicle remote-operation apparatus.
Figure 8:
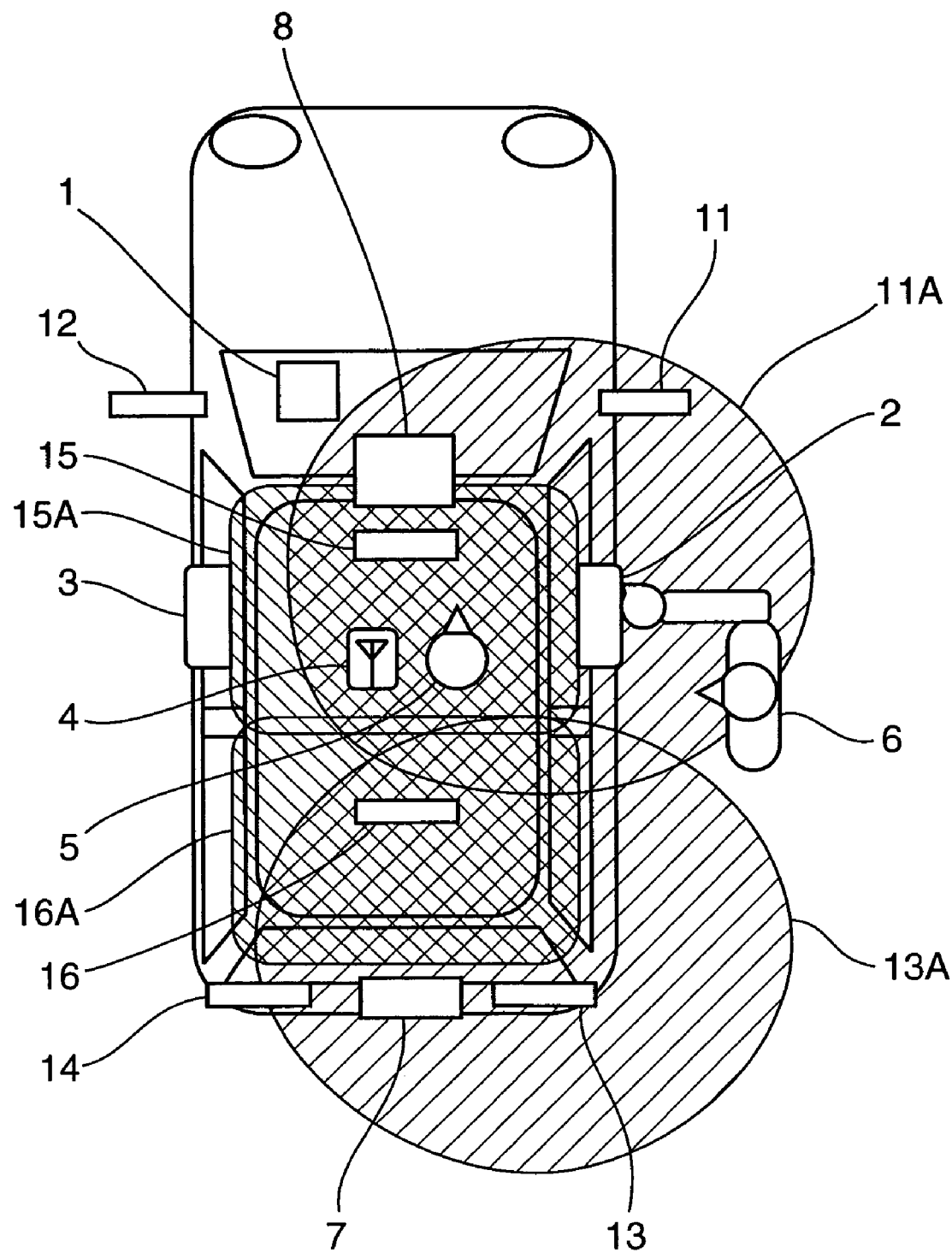
FIG. 8 is a top view of the conventional vehicle remote-operation apparatus installed in a vehicle, showing its configuration.

Hereinafter, a vehicle remote-operation apparatus according to an embodiment of the present invention will be described with reference to the attached drawings. FIG. 1 is a top view of the vehicle remote-operation apparatus installed in a vehicle according to the embodiment of the present invention, showing its configuration. FIG. 2 is a block diagram, showing the configuration of the vehicle remote-operation apparatus shown in FIG. 1. FIG. 3 is a diagram, showing an operational sequence of the vehicle remote-operation apparatus shown in FIG. 1.

As shown in FIG. 1 and FIG. 2, the vehicle remote-operation apparatus includes a vehicle-side communication unit 20 provided in the vehicle, and a portable unit 24 which is allocated an identification code unique to the vehicle and can communicate by radio with the vehicle-side communication unit 20.

The portable unit 24 includes: a communication section 41; a control section 42; and an identification-code storage section 43. The control section 42 receives an authentication request signal from the vehicle-side communication unit 20, using the communication section 41. Receiving the authentication request signal, the control section 42 reads an identification code stored in advance in the identification-code storage section 43. Then, it transmits an authentication response signal including this identification code, using the communication section 41.

The vehicle-side communication unit 20 includes: door outside switches 22, 23, 27; an authentication-signal receiver 28; a door-lock switch 29; vehicle-outside antennas 31 to 34; and vehicle-inside antennas 35, 36.

As shown in FIG. 1, in a vehicle, vehicle-outside antennas 31, 32, 33, 34 are provided near the door on the driver's seat side, near the door on the passenger-seat side, inside of or near a rear bumper on the driver's seat side and inside of or near the rear bumper on the passenger-seat side, respectively. Inside of the vehicle, vehicle-inside antennas 35, 36 are provided.

The vehicle-outside antennas 31 to 34 transmit the authentication request signal for the portable unit 24 at least to the outside of the vehicle. Specifically, the vehicle-outside antenna 31 transmits the authentication request signal to a communicable range 31A around the vicinity of the door on the driver's seat side of the vehicle. The vehicle-outside antenna 32 transmits the authentication request signal to the communicable range (i.e., the range which is substantially symmetrical, like mirror-plane symmetry, to the communicable range 31A with respect to the vehicle's longitudinal-direction middle line as the symmetrical line; not shown) around the vicinity of the door on the passenger-seat side of the vehicle. The vehicle-outside antenna 33 transmits the authentication request signal to a communicable range 33A around the vicinity of the rear bumper on the driver's seat side of the vehicle. The vehicle-outside antenna 34 transmits the authentication request signal to the communicable range (i.e., the range which is substantially symmetrical, like mirror-plane symmetry, to the communicable range 33A with respect to the vehicle's longitudinal-direction middle line as the symmetrical line; not shown) around the vicinity of the rear bumper on the driver's seat side of the vehicle.

The vehicle-inside antennas 35, 36 transmit the authentication request signal only to the inside of the vehicle. Specifically, the vehicle-inside antenna 35 transmits the authentication request signal to a communicable range 35A which covers substantially the front part on the inside of the vehicle. On the other hand, the vehicle-inside antenna 36 transmits the authentication request signal to a communicable range 36A which covers substantially the rear part on the inside of the vehicle.

A control unit 21 is provided inside of the dashboard of the vehicle. It transmits the authentication request signal, using the vehicle-outside antennas 31 to 34 and the vehicle-inside antennas 35, 36. Besides, using the vehicle-inside antennas 35, 36, the control unit 21 transmits, only to the inside of the vehicle, an interference wave for hindering the vehicle's inside from receiving the authentication request signal by the vehicle-outside antennas 31 to 34.

The door outside switch 22 detects a user (i.e., a vehicle owner or a third person) touching the door on the driver's seat side of the vehicle, so that it is turned on. Then, it outputs, to the control unit 21, an on-signal which indicates that the user has touched the door on the driver's seat side. At this time, using the vehicle-outside antenna 31, the control unit 21 transmits the authentication request signal to the communicable range 31A. Then, using the vehicle-inside antennas 35, 36, the control unit 21 transmits the interference wave only to the inside of the vehicle.

Herein, if the user (e.g., the vehicle owner) who has touched the door on the driver's seat side is carrying the portable unit 24, in such a way as described above, the authentication response signal is transmitted from the portable unit 24. Then, the authentication-signal receiver 28 receives the authentication response signal from the portable unit 24. Sequentially, it compares the identification code which it stores beforehand in its internal memory and the identification code included in the authentication response signal. If both are identical, the authentication-signal receiver 28 outputs, to the control unit 21, a door-lock switch signal for giving an instruction to unlock (or open) the vehicle's door. Then, the control unit 21 controls the door-lock switch 29 so that the vehicle's door is unlocked.

On the other hand, let's assume that the user who has touched the door on the driver's seat side is not carrying the portable unit 24 (e.g., the vehicle owner inside of the vehicle is holding the portable unit 24 and a third person touches the door on the driver's seat side). The portable unit 24 cannot receive the authentication request signal because of the interference wave, and thus, it does not transmit the authentication response signal. Therefore, the authentication-signal receiver 28 does not receive the authentication response signal from the portable unit 24. Hence, it does not output the door-lock switch signal to the control unit 21. Consequently, the control unit 21 keeps controlling the door-lock switch 29 so that the vehicle's door is not unlocked.

Furthermore, the door outside switch 23 detects a user touching the door on the passenger-seat side of the vehicle, so that it is turned on. Then, it outputs, to the control unit 21, an on-signal which indicates that the user has touched the door on the passenger-seat side. At this time, using the vehicle-outside antenna 32, the control unit 21 transmits the authentication request signal to the range where the vehicle-outside antenna 32 can communicate. Then, using the vehicle-inside antennas 35, 36, the control unit 21 transmits the interference wave only to the inside of the vehicle. Thereafter, the control unit 21 operates in the same way as described above. Unless the authentication-signal receiver 28 receives the authentication response signal from the portable unit 24, the door-lock switch 29 is controlled so that the vehicle's door is not unlocked.

Moreover, the door outside switch 27 detects a user touching the door on the rear side of the vehicle, so that it is turned on. Then, it outputs, to the control unit 21, an on-signal which indicates that the user has touched the door on the rear side. At this time, using the vehicle-outside antenna 33 (or 34), the control unit 21 transmits the authentication request signal to the communicable range 33A. Then, using the vehicle-inside antennas 35, 36, the control unit 21 transmits the interference wave only to the inside of the vehicle. Thereafter, the control unit 21 operates in the same way as described above. Unless the authentication-signal receiver 28 receives the authentication response signal from the portable unit 24, the door-lock switch 29 is controlled so that the vehicle's door is not unlocked.

Next, an operation method will be described of the vehicle remote-operation apparatus configured above. First, inside of a vehicle, a vehicle owner 25 is holding the portable unit 24 with a radio terminal which is allocated an identification code unique to the vehicle. When a third person 26 who does not own the portable unit 24 comes close to the vehicle, if the third person 26 touches the door on the driver's seat side, the door outside switch 22 is turned on. Then, this on-signal is transmitted to the control unit 21, and the control unit 21 transmits the authentication request signal, using the vehicle-outside antenna 31.

In this way, the authentication request signal (i.e., a regular code) is transmitted only for the period T2 from the vehicle-outside antenna 31 (see FIG. 3(*a*)). Simultaneously, the control unit 21 transmits only for the period T2, for example, an interference wave such as a burst wave, to the communicable ranges 35A, 36A from the vehicle-inside antennas 35, 36 (see FIGS. 3(*b*), 3(*c*)).

Herein, as the burst wave, for example, a signal can be used which has a single frequency and a constant amplitude. However, the interference wave is not limited especially to this example. Various signals can be used, as long as they can hinder the portable unit 24 from receiving the regular authentication request signal inside of the vehicle. In addition, the interference-wave output period is not limited especially to the above described example, either. Another period of time may also be used, as long as the output period T2 of the authentication request signal is included. For example, a predetermined margin period may also be added, before and/or after the period T2.

In the above described case, the portable unit 24 inside of the vehicle is within the communicable range 31A of the vehicle-outside antenna 31. However, it is within the communicable range 35A of the vehicle-inside antenna 35, so that the portable unit 24 does not make an authentication response (see FIG. 3(*d*)). Thus, the door remains locked.

As shown in FIG. 3, this authentication time is T2, so that the authentication time can be shortened by the total output time (T1×2) of the conventional communication standby signal. This makes it possible to shorten the processing time from the time when the door outside switch 22 is turned on to the time when the door lock is opened.

Furthermore, similarly, even if the third person 26 approaches on the passenger-seat side to turn on the door outside switch 23, the authentication signal is transmitted from the vehicle-outside antenna 32. But simultaneously, the interference wave is transmitted from the vehicle-inside antennas 35, 36. Hence, the door lock remains closed.

On the other hand, if the vehicle owner 25 who is holding the portable unit 24 turns on the door outside switch 22, the interference wave does not affect the vehicle's outside. Thus, the authentication response signal is transmitted from the portable unit 24, and the authentication-signal receiver 28 receives the authentication response signal from the portable unit 24. This result is checked, and the door-lock switch signal is outputted to the control unit 21. Then, the control unit 21 controls the door-lock switch 29 so that the vehicle's door is unlocked. Thereby, the door lock is lifted.

In this case, the control unit 21 can detect the vehicle owner 25 who is holding the portable unit 24 or the portable unit 24 being located within the vehicle-outside region (i.e., the communicable range of the vehicle-outside antenna 31 excluding the overlapping part of the communicable range 31A of the vehicle-outside antenna 31 and the communicable ranges 35A, 36A of the vehicle-inside antennas 35, 36) near the door on the driver's seat side.

In the same way, if the vehicle owner 25 who is holding the portable unit 24 turns on the door outside switch 23, it can detect the portable unit 24 being located within the vehicle-outside region (i.e., the communicable range of the vehicle-outside antenna 32 other than the overlapping part of the communicable range of the vehicle-outside antenna 32 and the communicable ranges 35A, 36A of the vehicle-inside antennas 35, 36) near the door on the passenger-seat side.

In addition, if the vehicle owner 25 who is holding the portable unit 24 turns on the door outside switch 27, the control unit 21 can detect it being located within the vehicle-outside region (i.e., the communicable range of the vehicle-outside antenna 33 (or 34) except the overlapping part of the communicable range of the vehicle-outside antenna 33 (or 34) and the communicable ranges 35A, 36A of the vehicle-inside antennas 35, 36) near the rear-side door. In this way, in this embodiment, where the portable unit 24 is located outside of the vehicle can also be detected.

Incidentally, reference character and numeral 33A denotes the range within which the vehicle-outside antenna 33 can communicate. Besides, in this embodiment, the communicable range is illustrated according to such an antenna disposition as shown in FIG. 1. However, the communicable range can also be controlled by varying the number of antennas which output the interference wave or their positional combination according to the characteristics or number of the antennas.

As described so far, in the vehicle remote-operation apparatus according to the present invention, the authentication request signal is transmitted from a chosen transmitter. At the same time, the interference wave for negating the authentication request signal is transmitted from at least one or more separate transmitters. This presents an advantage in that a vehicle remote-operation apparatus can be realized which is capable of, without a regular request, preventing authentication communication from being established. Hence, the present invention is useful as a vehicle remote-operation apparatus which controls an automobile so that its doors can be locked or unlocked and the engine can be started, according to the authentication result obtained using a portable unit.

As described above, a vehicle remote-operation apparatus according to the present invention, comprising: a radio portable unit which is allocated an identification code unique to a vehicle; a plurality of transmitters which output an authentication request signal to the portable unit; an authentication-signal receiver which receives an authentication response signal outputted from the portable unit in response to the authentication request signal; and a controller which controls a specific in-vehicle unit based on the authentication result of the authentication response signal, so that the in-vehicle unit is permitted to operate or prohibited from operating, wherein when the portable unit is inside of the vehicle, the controller controls the plurality of transmitters so that a transmitter outside of the vehicle among the plurality of transmitters transmits a regular authentication request signal and so that at least one or more transmitters inside of the vehicle transmit an interference wave for negating the authentication request signal, and limits the communicable range between the portable unit and the transmitters.

In this vehicle remote-operation apparatus, the regular authentication request signal is transmitted from a transmitter outside of the vehicle. At the same time, the interference wave is transmitted from at least one or more transmitters inside of the vehicle. Thereby, the communicable range can be limited between the portable unit and the transmitters. This helps prevent the authentication communication from being established without the regular communication request. Hence, a vehicle remote-operation apparatus can be realized which is capable of, if there is the portable unit inside of the vehicle, then in a short time, hindering the authentication communication from being established without the regular communication request.

It is preferable that the interference wave be a burst wave. In this case, the burst wave is transmitted simultaneously with the authentication request signal. This makes it possible to instantly interfere with the authentication request signal.

Another vehicle remote-operation apparatus according to the present invention, comprising: a vehicle-side communication unit which is provided in a vehicle; and a portable unit which is allocated an identification code unique to a vehicle and communicates by radio with the vehicle-side communication unit, wherein: the vehicle-side communication unit includes a vehicle-outside transmitter which transmits an authentication request signal for the portable unit to at least the outside of the vehicle, a vehicle-inside transmitter which transmits the authentication request signal to the inside of the vehicle, an authentication-signal receiver which receives an authentication response signal outputted from the portable unit in response to the authentication request signal, and a controller which controls a specific in-vehicle unit based on the authentication result of the authentication response signal, so that the in-vehicle unit is permitted to operate or prohibited from operating; and the controller transmits the authentication request signal using the vehicle-outside transmitter, and using the vehicle-inside transmitter, transmits, to the inside of the vehicle, an interference wave for disabling the inside of the vehicle from receiving the authentication request signal by the vehicle-outside transmitter.

In this vehicle remote-operation apparatus, the authentication request signal is transmitted using the vehicle-outside transmitter, and the interference wave is transmitted to the inside of the vehicle, using the vehicle-inside transmitter. Therefore, if a user outside of the vehicle is holding the portable unit, authentication communication with the portable unit can be executed, using the authentication request signal by the vehicle-outside transmitter. This permits the regular user to operate the in-vehicle unit. In contrast, if a user inside of the vehicle is holding the portable unit and if a third person who does not own the portable unit is outside of the vehicle, then regardless of the third person's motion, the interference wave transmitted simultaneously with the authentication request signal makes it impossible to execute authentication communication with the portable unit. Thereby, the third person can be prohibited from operating the in-vehicle unit. Consequently, there is no need to transmit the communication standby signal separately for a predetermined period, as is the case with the prior art. This helps shorten the processing time for authentication communication. It also helps prevent a wrong authentication for a third person who does not own the portable unit, thereby making the in-vehicle unit's operation safer.

Preferably, the vehicle-outside transmitter should include a plurality of vehicle-outside transmitters provided in different positions of the peripheral part of the vehicle; the vehicle-side communication unit should further include a plurality of motion detectors which are provided in different positions of the peripheral part of the vehicle and detects a user making a motion to the vehicle; and if one motion detector of the plurality of motion detectors detects a user making a motion, the controller should transmit the authentication request signal using one vehicle-outside transmitter located near the motion detector among the plurality of vehicle-outside transmitters, and should transmit the interference wave to the inside of the vehicle using the vehicle-inside transmitter.

In this case, the authentication request signal is transmitted, using one vehicle-outside transmitter located near the motion detector which has detected a user making a motion. Therefore, if the user is holding the portable unit, the authentication request signal can be certainly transmitted to the portable unit.

It is preferable that the vehicle-inside transmitter include a plurality of vehicle-inside transmitters provided in different positions inside of the vehicle; and if one motion detector of the plurality of motion detectors detects a user making a motion, the controller transmit the authentication request signal using one vehicle-outside transmitter located near the motion detector among the plurality of vehicle-outside transmitters, and transmit the interference wave to the inside of the vehicle using at least one vehicle-inside transmitter of the plurality of vehicle-inside transmitters.

In this case, the interference wave is transmitted using at least one vehicle-inside transmitter. Therefore, if a user inside of the vehicle is holding the portable unit and if a third person who does not own the portable unit is outside of the vehicle, then regardless of the third person's motion, the interference wave makes it impossible to execute authentication communication with the portable unit.

Preferably, if one motion detector of the plurality of motion detectors detects a user making a motion, the controller should transmit the authentication request signal using one vehicle-outside transmitter located near the motion detector among the plurality of vehicle-outside transmitters, and should transmit the interference wave to the inside of the vehicle using all the plurality of vehicle-inside transmitters.

In this case, the interference wave is transmitted using all the vehicle-inside transmitters. Therefore, if a user inside of the vehicle is holding the portable unit and if a third person who does not own the portable unit is outside of the vehicle, the interference wave can be certainly transmitted to the whole of the vehicle's inside. This surely makes it impossible to execute authentication communication with the portable unit.

It is preferable that the plurality of motion detectors include a first door outside switch which detects a user touching the door on the driver's seat side of the vehicle; the plurality of vehicle-outside transmitters include a first vehicle-outside antenna provided near the driver's seat side of the vehicle; the vehicle-side communication unit further include a door-lock switch which locks or unlocks a door of the vehicle; and if the first door outside switch detects a user touching the door on the driver's seat side of the vehicle, the controller transmit the authentication request signal using the first vehicle-outside antenna and transmit the interference wave to the inside of the vehicle using at least one vehicle-inside transmitter of the plurality of vehicle-inside transmitters, and if the authentication-signal receiver does not receive the authentication response signal from the portable unit, the controller control the door-lock switch so that the door-lock switch does not unlock the door of the vehicle.

In this case, the authentication request signal is transmitted using the first vehicle-outside antenna, and the interference wave is transmitted to the inside of the vehicle using the vehicle-inside transmitter. Therefore, if a user who is holding the portable unit touches the door on the driver's seat side of the vehicle, authentication communication with the portable unit can be executed, using the authentication request signal by the first vehicle-outside antenna. This permits the regular user to unlock the vehicle's door. On the other hand, if a user inside of the vehicle is holding the portable unit and if a third person who does not own the portable unit touches the door on the driver's seat side of the vehicle, the interference wave makes it impossible to execute authentication communication with the portable unit. Thereby, the third person can be prohibited from unlocking the vehicle's door.

Preferably, the plurality of motion detectors should further include a second door outside switch which detects a user touching the door on the passenger-seat side of the vehicle; the plurality of vehicle-outside transmitters should further include a second vehicle-outside antenna provided near the passenger-seat side of the vehicle; and if the second door outside switch detects a user touching the door on the passenger-seat side of the vehicle, the controller should transmit the authentication request signal using the second vehicle-outside antenna and should transmit the interference wave to the inside of the vehicle using at least one vehicle-inside transmitter of the plurality of vehicle-inside transmitters, and if the authentication-signal receiver does not receive the authentication response signal from the portable unit, the controller should control the door-lock switch so that the door-lock switch does not unlock the doors of the vehicle.

In this case, the authentication request signal is transmitted using the second vehicle-outside antenna, and the interference wave is transmitted to the inside of the vehicle using the vehicle-inside transmitter. Therefore, if a user who is holding the portable unit touches the door on the passenger-seat side of the vehicle, authentication communication with the portable unit can be executed, using the authentication request signal by the second vehicle-outside antenna. This permits the regular user to unlock the vehicle's door. On the other hand, if a user inside of the vehicle is holding the portable unit and if a third person who does not own the portable unit touches the door on the passenger-seat side of the vehicle, the interference wave makes it impossible to execute authentication communication with the portable unit. Thereby, the third person can be prohibited from unlocking the vehicle's door.

It is preferable that the plurality of motion detectors further include a third door outside switch which detects a user touching the door on the rear side of the vehicle; the plurality of vehicle-outside transmitters further include a third vehicle-outside antenna provided near the door on the rear side of the vehicle; and if the third door outside switch detects a user touching the door on the rear side of the vehicle, the controller transmit the authentication request signal using the third vehicle-outside antenna and transmit the interference wave to the inside of the vehicle using at least one vehicle-inside transmitter of the plurality of vehicle-inside transmitters, and if the authentication-signal receiver does not receive the authentication response signal from the portable unit, the controller control the door-lock switch so that the door-lock switch does not unlock the doors of the vehicle.

In this case, the authentication request signal is transmitted using the third vehicle-outside antenna, and the interference wave is transmitted to the inside of the vehicle using the vehicle-inside transmitter. Therefore, if a user who is holding the portable unit touches the door on the rear side of the vehicle, authentication communication with the portable unit can be executed, using the authentication request signal by the third vehicle-outside antenna. This permits the regular user to unlock the vehicle's door. On the other hand, if a user inside of the vehicle is holding the portable unit and if a third person who does not own the portable unit touches the door on the rear side of the vehicle, the interference wave makes it impossible to execute authentication communication with the portable unit. Thereby, the third person can be prohibited from unlocking the vehicle's door.

It is preferable that the interference wave be a burst wave. In this case, the burst wave is transmitted simultaneously with the authentication request signal. This makes it possible to instantly interfere with the authentication request signal.

Preferably, the controller should transmit the authentication request signal only for a first period using the vehicle-outside transmitters, and should transmit the interference wave to the inside of the vehicle only for a second period including the first period using the vehicle-inside transmitters.

In this case, the interference wave can always be transmitted while the authentication request signal is transmitted. Therefore, if a user inside of the vehicle is holding the portable unit and if a third person who does not own the portable unit is outside of the vehicle, authentication communication with the portable unit can be certainly impossible.

The above described controller may also transmit the authentication request signal only for a first period using the vehicle-outside transmitters and transmit the interference wave to the inside of the vehicle only for the first period using the vehicle-inside transmitters.

In this case, the authentication request signal and the interference wave are transmitted for the same period. Therefore, if a user inside of the vehicle is holding the portable unit and if a third person who does not own the portable unit is outside of the vehicle, authentication communication with the portable unit can be certainly impossible. Besides, the processing time taken for authentication communication can be shortened to a required minimum.

A vehicle-side communication unit according to the present invention which is provided in a vehicle and communicates by radio with a portable unit allocated an identification code unique to the vehicle, comprising: a vehicle-outside transmitter which transmits an authentication request signal for the portable unit to at least the outside of the vehicle; a vehicle-inside transmitter which transmits the authentication request signal to the inside of the vehicle; an authentication-signal receiver which receives an authentication response signal outputted from the portable unit in response to the authentication request signal; and a controller which controls a specific in-vehicle unit based on the authentication result of the authentication response signal, so that the in-vehicle unit is permitted to operate or prohibited from operating, wherein the controller transmits the authentication request signal using the vehicle-outside transmitter, and using the vehicle-inside transmitter, transmits, to the inside of the vehicle, an interference wave for disabling the inside of the vehicle from receiving the authentication request signal by the vehicle-outside transmitter.

In this vehicle-side communication unit, the authentication request signal is transmitted using the vehicle-outside transmitter, and the interference wave is transmitted to the inside of the vehicle, using the vehicle-inside transmitter. Therefore, if a user outside of the vehicle is holding the portable unit, authentication communication with the portable unit can be executed, using the authentication request signal by the vehicle-outside transmitter. This permits the regular user to operate the in-vehicle unit. In contrast, if a user inside of the vehicle is holding the portable unit and if a third person who does not own the portable unit is outside of the vehicle, then regardless of the third person's motion, the interference wave transmitted simultaneously with the authentication request signal makes it impossible to execute authentication communication with the portable unit. Thereby, the third person can be prohibited from operating the in-vehicle unit. Consequently, there is no need to transmit the communication standby signal separately for a predetermined period, as is the case with the prior art. This helps shorten the processing time for authentication communication. It also helps prevent a wrong authentication for a third person who does not own the portable unit, thereby making the in-vehicle unit's operation safer.

This application is based on Japanese patent application serial No. 2005-048356, filed in Japan Patent Office on Feb. 24, 2005, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle remote-operation apparatus, comprising:
a radio portable unit which is allocated an identification code unique to a vehicle;
a plurality of transmitters which output an authentication request signal to the portable unit;
an authentication-signal receiver which receives an authentication response signal outputted from the portable unit in response to the authentication request signal; and
a controller which controls a specific in-vehicle unit based on the authentication result of the authentication response signal, so that the in-vehicle unit is permitted to operate or prohibited from operating,
wherein when the portable unit is inside of the vehicle, the controller controls the plurality of transmitters so that a transmitter outside of the vehicle among the plurality of transmitters transmits a regular authentication request signal and so that at least one or more transmitters inside of the vehicle transmit an interference wave for negating the authentication request signal, and limits the communicable range between the portable unit and the transmitters.

2. The vehicle remote-operation apparatus according to claim 1, wherein the interference wave is a burst wave.

3. A vehicle remote-operation apparatus, comprising:
a vehicle-side communication unit which is provided in a vehicle; and a portable unit which is allocated an identification code unique to a vehicle and communicates by radio with the vehicle-side communication unit, wherein:

the vehicle-side communication unit includes, a vehicle-outside transmitter which transmits an authentication request signal for the portable unit to at least the outside of the vehicle, a vehicle-inside transmitter which transmits the authentication request signal to the inside of the vehicle, an authentication-signal receiver which receives an authentication response signal outputted from the portable unit in response to the authentication request signal, and a controller which controls a specific in-vehicle unit based on the authentication result of the authentication response signal, so that the in-vehicle unit is permitted to operate or prohibited from operating; and the controller transmits the authentication request signal using the vehicle-outside transmitter, and using the vehicle-inside transmitter, transmits, to the inside of the vehicle, an interference wave for disabling the inside of the vehicle from receiving the authentication request signal by the vehicle-outside transmitter.

4. The vehicle remote-operation apparatus according to claim 3, wherein:

the vehicle-outside transmitter includes a plurality of vehicle-outside transmitters provided in different positions of the peripheral part of the vehicle;

the vehicle-side communication unit further includes a plurality of motion detectors which are provided in different positions of the peripheral part of the vehicle and detects a user making a motion to the vehicle; and if one motion detector of the plurality of motion detectors detects a user making a motion, the controller transmits the authentication request signal using one vehicle-outside transmitter located near the motion detector among the plurality of vehicle-outside transmitters, and transmits the interference wave to the inside of the vehicle using the vehicle-inside transmitter.

5. The vehicle remote-operation apparatus according to claim 4, wherein:

the vehicle-inside transmitter includes a plurality of vehicle-inside transmitters provided in different positions inside of the vehicle; and if one motion detector of the plurality of motion detectors detects a user making a motion, the controller transmits the authentication request signal using one vehicle-outside transmitter located near the motion detector among the plurality of vehicle-outside transmitters, and transmits the interference wave to the inside of the vehicle using at least one vehicle-inside transmitter of the plurality of vehicle-inside transmitters.

6. The vehicle remote-operation apparatus according to claim 5, wherein if one motion detector of the plurality of motion detectors detects a user making a motion, the controller transmits the authentication request signal using one vehicle-outside transmitter located near the motion detector among the plurality of vehicle-outside transmitters, and transmits the interference wave to the inside of the vehicle using all the plurality of vehicle-inside transmitters.

7. The vehicle remote-operation apparatus according to claim 5, wherein:

the plurality of motion detectors include a first door outside switch which detects a user touching the door on the driver's seat side of the vehicle;

the plurality of vehicle-outside transmitters include a first vehicle-outside antenna provided near the driver's seat side of the vehicle;

the vehicle-side communication unit further includes a door-lock switch which locks or unlocks a door of the vehicle; and if the first door outside switch detects a user touching the door on the driver's seat side of the vehicle, the controller transmits the authentication request signal using the first vehicle-outside antenna and transmits the interference wave to the inside of the vehicle using at least one vehicle-inside transmitter of the plurality of vehicle-inside transmitters, and if the authentication-signal receiver does not receive the authentication response signal from the portable unit, the controller controls the door-lock switch so that the door-lock switch does not unlock the door of the vehicle.

8. The vehicle remote-operation apparatus according to claim 7, wherein:

the plurality of motion detectors further include a second door outside switch which detects a user touching the door on the passenger-seat side of the vehicle;

the plurality of vehicle-outside transmitters further include a second vehicle-outside antenna provided near the passenger-seat side of the vehicle; and if the second door outside switch detects a user touching the door on the passenger-seat side of the vehicle, the controller transmits the authentication request signal using the second vehicle-outside antenna and transmits the interference wave to the inside of the vehicle using at least one vehicle-inside transmitter of the plurality of vehicle-inside transmitters, and if the authentication-signal receiver does not receive the authentication response signal from the portable unit, the controller controls the door-lock switch so that the door-lock switch does not unlock the doors of the vehicle.

9. The vehicle remote-operation apparatus according to claim 8, wherein:

the plurality of motion detectors further include a third door outside switch which detects a user touching the door on the rear side of the vehicle;

the plurality of vehicle-outside transmitters further include a third vehicle-outside antenna provided near the door on the rear side of the vehicle; and if the third door outside switch detects a user touching the door on the rear side of the vehicle, the controller transmits the authentication request signal using the third vehicle-outside antenna and transmits the interference wave to the inside of the vehicle using at least one vehicle-inside transmitter of the plurality of vehicle-inside transmitters, and if the authentication-signal receiver does not receive the authentication response signal from the portable unit, the controller controls the door-lock switch so that the door-lock switch does not unlock the doors of the vehicle.

10. The vehicle remote-operation apparatus according to claim 3, wherein the interference wave is a burst wave.

11. The vehicle remote-operation apparatus according to claim 3, wherein the controller transmits the authentication request signal only for a first period using the vehicle-outside transmitter, and transmits the interference wave to the inside of the vehicle only for a second period including the first period using the vehicle-inside transmitter.

12. The vehicle remote-operation apparatus according to claim 3, wherein the controller transmits the authentication request signal only for a first period using the vehicle-outside transmitter, and transmits the interference wave to the inside of the vehicle only for the first period using the vehicle-inside transmitter.

13. A vehicle-side communication unit which is provided in a vehicle and communicates by radio with a portable unit allocated an identification code unique to the vehicle, comprising:

a vehicle-outside transmitter which transmits an authentication request signal for the portable unit to at least the outside of the vehicle;

a vehicle-inside transmitter which transmits the authentication request signal to the inside of the vehicle;

an authentication-signal receiver which receives an authentication response signal outputted from the portable unit in response to the authentication request signal; and a controller which controls a specific in-vehicle unit based on the authentication result of the authentication response signal, so that the in-vehicle unit is permitted to operate or prohibited from operating, wherein the controller transmits the authentication request signal using the vehicle-outside transmitter, and using the vehicle-inside transmitter, transmits, to the inside of the vehicle, an interference wave for disabling the inside of the vehicle from receiving the authentication request signal by the vehicle-outside transmitter.

* * * * *